United States Patent
Yoo et al.

(10) Patent No.: US 12,536,029 B2
(45) Date of Patent: Jan. 27, 2026

(54) MEMORY MANAGEMENT SYSTEM USING IN-MEMORY DATA ISOLATION TABLE AND METHOD FOR MANAGING MEMORY

(71) Applicant: SAMSUNG ELECTRONICS CO., LTD., Suwon-si (KR)

(72) Inventors: Jae Sung Yoo, Suwon-si (KR); Jong Min Kim, Suwon-si (KR); Choonghyo Kim, Suwon-si (KR); Myung-Sik Choi, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 814 days.

(21) Appl. No.: 17/864,088

(22) Filed: Jul. 13, 2022

(65) Prior Publication Data

US 2023/0141225 A1 May 11, 2023

(30) Foreign Application Priority Data

Nov. 5, 2021 (KR) .......................... 10-2021-0151190

(51) Int. Cl.
*G06F 9/455* (2018.01)
*G06F 9/48* (2006.01)

(52) U.S. Cl.
CPC ........ *G06F 9/45558* (2013.01); *G06F 9/4881* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 7,428,626 B2 | 9/2008 | Vega | |
| 8,090,919 B2* | 1/2012 | Sahita | H04L 9/3234 |
| | | | 711/163 |
| 8,392,628 B2* | 3/2013 | Santos | G06F 12/1081 |
| | | | 711/6 |
| 8,418,175 B2 | 4/2013 | Mansell et al. | |
| 9,229,651 B2* | 1/2016 | Min | G06F 9/45558 |
| 9,459,907 B2 | 10/2016 | Tsirkin | |
| 9,465,750 B2 | 10/2016 | Nakada et al. | |
| 9,501,637 B2* | 11/2016 | LeMay | G06F 9/45533 |
| 9,703,726 B2 | 7/2017 | Lutas | |

(Continued)

OTHER PUBLICATIONS

Communication (Search Report) dated Dec. 13, 2022, issued by the European Patent Office in counterpart European Application No. 22 184 402.0.

(Continued)

*Primary Examiner* — Van H Nguyen
(74) *Attorney, Agent, or Firm* — Sughrue Mion, PLLC

(57) ABSTRACT

A memory management system includes a first virtual machine, a second virtual machine, and a hypervisor configured to manage a region to which the first virtual machine and the second virtual machine access in a memory, control the first virtual machine to access a first region and a shared region in the memory, control the second virtual machine to access the shared region and a second region different from the first region in the memory, and in response to a request of the first virtual machine, store an in-memory data isolation (IMDI) table that indicates an IMDI region that a task of the first virtual machine accesses and a task of the second virtual machine does not access, in the memory.

12 Claims, 11 Drawing Sheets

(56) References Cited

U.S. PATENT DOCUMENTS

| | | | |
|---|---|---|---|
| 9,792,222 B2 | 10/2017 | Sahita et al. | |
| 9,798,565 B2 * | 10/2017 | Persson | G06F 9/45558 |
| 9,990,139 B2 * | 6/2018 | Nadakuditi | G06F 9/44 |
| 10,013,199 B2 | 7/2018 | Tsirkin et al. | |
| 10,216,649 B2 | 2/2019 | Tsirkin et al. | |
| 10,515,019 B1 | 12/2019 | Iyigun et al. | |
| 10,534,653 B2 * | 1/2020 | Hwang | G06F 9/5077 |
| 10,552,345 B2 | 2/2020 | Tsirkin | |
| 10,853,121 B2 * | 12/2020 | Antony | G06F 11/3006 |
| 10,860,718 B2 * | 12/2020 | Seetharamaiah | G06F 9/45558 |
| 11,782,744 B2 * | 10/2023 | Hoogerbrugge | H04L 9/0643 |
| | | | 713/193 |
| 2008/0098197 A1 | 4/2008 | Craddock et al. | |
| 2015/0178497 A1 | 6/2015 | Lukacs et al. | |
| 2015/0293776 A1 * | 10/2015 | Persson | G06F 9/50 |
| | | | 718/1 |
| 2018/0173555 A1 | 6/2018 | Lutas | |
| 2018/0341529 A1 * | 11/2018 | Kou | G06F 9/5077 |
| 2020/0409740 A1 | 12/2020 | Li et al. | |
| 2022/0114002 A1 * | 4/2022 | Hoogerbrugge | G06F 9/45558 |

OTHER PUBLICATIONS

Communication dated Dec. 23, 2022, issued by the European Patent Office in counterpart European Application No. 22 184 402.0.

* cited by examiner

| VMID | TUID | Starting Address | Size |
|------|------|------------------|------|
| 1 | K1 | a | b |
| ⋮ | ⋮ | ⋮ | ⋮ |

MEMORY MANAGEMENT SYSTEM USING IN-MEMORY DATA ISOLATION TABLE AND METHOD FOR MANAGING MEMORY

CROSS-REFERENCE TO RELATED APPLICATION(S)

This application is based on and claims priority from Korean Patent Application No. 10-2021-0151190 filed on Nov. 5, 2021 in the Korean Intellectual Property Office, the disclosure of which is incorporated herein in its entirety by reference.

BACKGROUND

1. Field

The disclosure relates generally to a memory management system and method for managing a memory.

2. Description of the Related Art

A memory system in which different users or different processes dividedly use a memory is used. In the case of such a memory system, when an isolation in the memory separation is not apparent, there is a risk of modulation of data stored in the memory due to a malicious attacker. As a result, research for improving this problem is being conducted.

SUMMARY

Provided are a memory management system and a method for managing memory having improved security reliability.

Additional aspects will be set forth in part in the description which follows and, in part, will be apparent from the description, or may be learned by practice of the presented embodiments.

According to an aspect of an example embodiment, a memory management system may include a first virtual machine, a second virtual machine, and a hypervisor configured to manage a region to which the first virtual machine and the second virtual machine access in a memory, control the first virtual machine to access a first region and a shared region in the memory, control the second virtual machine to access the shared region and a second region different from the first region in the memory, and in response to a request of the first virtual machine, store an in-memory data isolation (IMDI) table that indicates an IMDI region that a task of the first virtual machine accesses and a task of the second virtual machine does not access, in the memory.

According to an aspect of an example embodiment, a memory management system may include a virtual machine on which a kernel level task is performed, and an IMDI circuit configured to receive an access request for an IMDI region of a memory from the kernel level task of the virtual machine, and determine whether to permit an access of the kernel level task of the virtual machine to the IMDI region, based on reference to a virtual machine ID and a task ID of an IMDI table that is stored in the memory and indicates the IMDI region.

According to an aspect of an example embodiment, a method may include providing a memory including a first region that a first virtual machine accesses and a second virtual machine does not access, a second region that the first virtual machine does not access and the second virtual machine accesses, and a shared region that the first virtual machine and the second virtual machine access, and storing, in the memory, an IMDI table, which indicates an IMDI region that a first task of the first virtual machine accesses and a second task of the first virtual machine does not access, in response to a request of the first task from the first virtual machine by a hypervisor.

According to an aspect of an example embodiment, a method may include providing a memory including a first region that a first virtual machine accesses and a second virtual machine does not access, a second region that the first virtual machine does not access and the second virtual machine accesses, a shared region that the first virtual machine and the second virtual machine access, an IMDI region that a first task of the first virtual machine accesses and a second task of the first virtual machine does not access, and an IMDI table indicating the IMDI region, and determining whether any one of the first task and the second task of the first virtual machine accesses the IMDI region based on reference to the IMDI table, in response to an access request to the IMDI region from any one of the first task or the second task of the first virtual machine, by an IMDI circuit.

However, aspects of the present invention are not restricted to the one set forth herein. The above and other aspects of the present invention will become more apparent to one of ordinary skill in the art to which the present invention pertains by referencing the detailed description of the present invention given below.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 is a diagram of the IMDI table of FIG. 3 according to an example embodiment;

DETAILED DESCRIPTION

Hereinafter, embodiments of the present disclosure will be described with reference to the accompanying drawings.

The embodiments described herein are example embodiments, and thus, the disclosure is not limited thereto and may be realized in various other forms. As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 1:
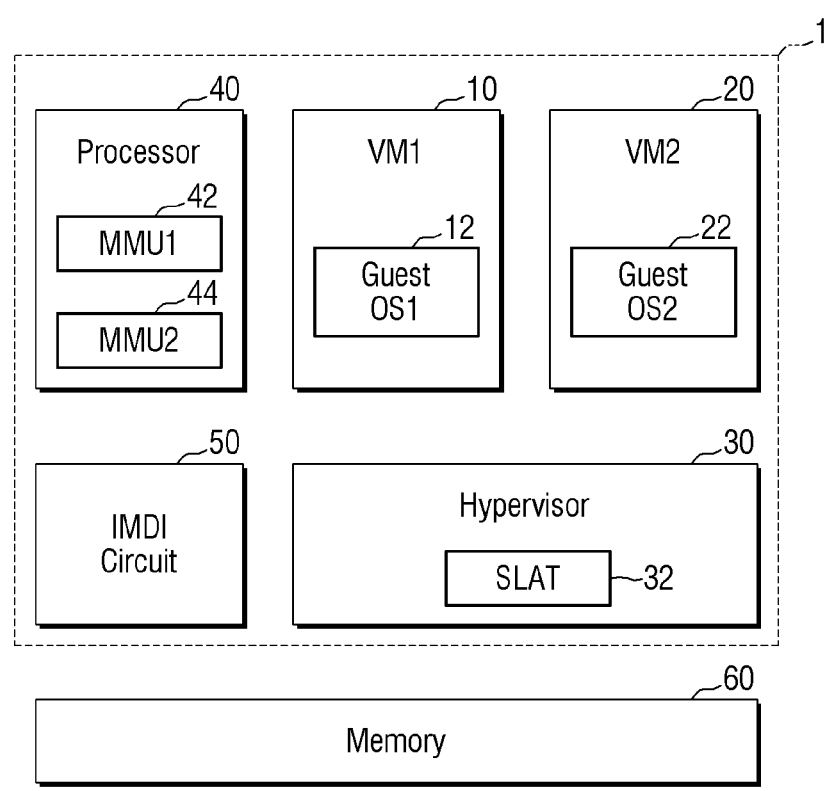
FIG. 1 is a block diagram of a memory management system according to an example embodiment.

FIG. 1 is a block diagram of a memory management system according to an example embodiment.

Referring to FIG. 1, the memory management system 1 may include virtual machines 10 and 20, a hypervisor 30, a processor 40, and an in-memory data isolation (IMDI) circuit 50. Although the drawings show an example in which there are two virtual machines 10 and 20, the number of virtual machines 10 and 20 may be modified as much as possible.

In some embodiments, the memory management system 1 may be configured to further include a memory 60.

The memory management system 1 may manage the memory 60. For example, the memory management system 1 may dividedly manage a region to which the virtual machine 10 is accessible and a region to which the virtual machine 20 is accessible, in the memory 60.

The virtual machine 10 may be driven by a guest operating system (OS) 12. The guest OS 12 may process a process requested by a user or a user process connected through the virtual machine 10.

The virtual machine 20 may be driven by the guest OS 22. The guest OS 22 may process a process requested by a user or a user process connected through the virtual machine 20.

In some embodiments, the guest OS 12 and the guest OS 22 may be different operating systems from each other. For example, the guest OS 12 may be an android operating system, and the guest OS 22 may be a Linux operating system. Further, in some embodiments, the guest OS 12 and the guest OS 22 may be the same operating system to each other.

The hypervisor 30 may dividedly manage the region to which the virtual machine 10 is accessible and the region to which the virtual machine 20 is accessible, in the memory 60.

In some embodiments, the memory 60 may include a dynamic random access memory (DRAM). In some embodiments, the memory 60 may include a double data rate synchronous DRAM (DDR SDRAM), a high bandwidth memory (HBM), a hybrid memory cube (HMC), a dual in-line memory module (DIMM), an optane DIMM or a non-volatile DIMM (NVMDIMM).

Further, in some embodiments, the memory 60 may include a non-volatile memory such as a NAND flash memory, a magnetic RAM (MRAM), a spin-transfer torque MRAM, a conductive bridging RAM (CBRAM), a ferroelectric RAM (FeRAM), a phase RAM (PRAM) and a resistive memory (resistive RAM).

A second level address translation (SLAT) module 32 of the hypervisor 30 may perform a second levels address translation for dividedly managing the region to which the virtual machine 10 is accessible and the region to which the virtual machine 20 is accessible, in the memory 60. Here, the guest OSs 12 and 22 may perform the first level address translation. A more specific explanation thereof will be provided below.

The processor 40 may perform the process necessary in the memory management system 1. The processor 40 may include a plurality of memory management units (MMU) 42 and 44. According to embodiments, the numbers of MMUs 42 and 44 may be modified differently from those shown.

A MMU 42 may be used to perform the first level address translation by the guest OSs 12 and 22. The guest OSs 12 and 22 may translate the virtual address provided to the virtual machines 10 and 20 into a first physical address, using the MMU 42.

A MMU 44 may be used to perform a second level address translation by a SLAT module 32. The SLAT module 32 may translate the first physical address provided from the virtual machines 10 and 20 into the second physical address, using the MMU 44.

In some embodiments, the first physical address and the second physical address may be different physical addresses from each other. Further, in some embodiments, the first physical address and the second physical address may be the same physical address to each other.

An IMDI circuit 50 may determine whether to permit an access of the virtual machines 10 and 20 to the IMDI region defined in the memory 60. For example, the IMDI circuit 50 may determine whether to permit an access of each task of the virtual machines 10 and 20 to the IMDI region defined in the memory 60. A more specific explanation thereof will also be provided below.

Although the drawings show an example in which the MMU 44 and the IMDI circuit 50 are separately implemented, in some embodiments, the IMDI circuit 50 may be implemented to be included in the MMU 44.

In some embodiments, the virtual machines 10 and 20 and the hypervisor 30 are implemented as software, and the processor 40 and the IMDI circuit 50 may be implemented as hardware. However, the embodiments are not limited thereto, and the embodiment may be changed as needed.

Figure 2:
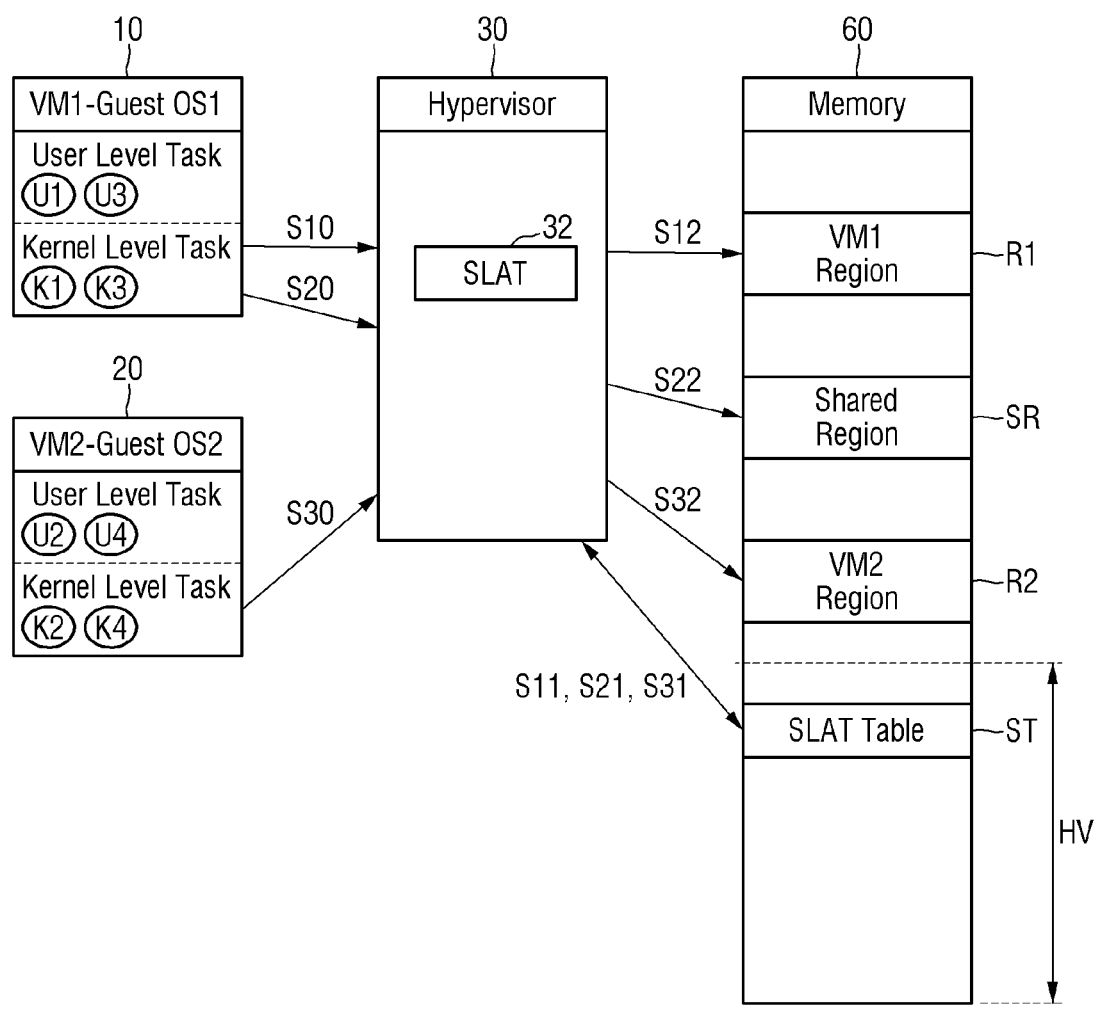
FIG. 2 is a diagram of a memory management operation of a hypervisor of FIG. 1, according to an example embodiment.

FIG. 2 is a diagram of a memory management operation of a hypervisor of FIG. 1, according to an example embodiment.

Referring to FIG. 2, the memory 60 may include a first region R1 to which only the virtual machine 10 is accessible, a second region R2 to which only the virtual machine 20 is accessible, and a shared region SR to which both the virtual machine 10 and the virtual machine 20 are accessible. Further, the memory 60 may include a SLAT table ST stored in a hypervisor region HV, to which the virtual machine 10 and the virtual machine 20 are inaccessible and to which only the hypervisor 30 is accessible.

The SLAT table ST may be a table used to perform a second level address translation by the SLAT module 32.

Referring to FIG. 2, in operation S10, the virtual machine 10 translates the virtual address into a first physical address using the MMU (42 of FIG. 1), and requests the hypervisor 30 to access the first region R1.

In response thereto, in operation S11, the SLAT module 32 of the hypervisor 30 translates the first physical address into the second physical address using the MMU (44 of FIG. 1) and the SLAT table ST, and the hypervisor 30 checks whether the virtual machine 10 has an access right to the first region R1.

In operation S12, when the hypervisor 30 permits an access, the virtual machine 10 can access the first region R1 to write data or read the stored data.

Next, in operation S20, the virtual machine 10 translates the virtual address into the first physical address using the MMU (42 of FIG. 1), and requests the hypervisor 30 to access the shared region R1.

In response thereto, in operation S21, the SLAT module 32 of the hypervisor 30 translates the first physical address into the second physical address using the MMU (44 of FIG.

1) and the SLAT table ST, and the hypervisor 30 checks whether the virtual machine 10 has the access right to the shared region SR.

In operation S22, when the hypervisor 30 permits an access, the virtual machine 10 can access the shared region SR to write data or read the stored data.

Next, in operation S30, the virtual machine 20 translates the virtual address into the first physical address using the MMU (42 of FIG. 1), and requests the hypervisor 30 to access the second region R2.

In response thereto, in operation S31, the SLAT module 32 of the hypervisor 30 translates the first physical address into the second physical address, using the MMU (44 of FIG. 1) and the SLAT table ST, and the hypervisor 30 checks whether the virtual machine 20 has the access right to the second region R2.

In operation S32, when the hypervisor 30 permits an access, the virtual machine 20 can access the second region R2 to write data or read the stored data.

On the other hand, although not shown in the drawing in detail, when the virtual machine 10 translates the virtual address into the first physical address using the MMU (42 of FIG. 1) and requests the hypervisor 30 to access the second region R2, the hypervisor 30 checks that the virtual machine 10 has no access right to the second region R2 using the MMU (44 of FIG. 1) and the SLAT table ST, and then may block an access of the virtual machine 10 to the second region R2.

Similarly, when the virtual machine 20 translates the virtual address into the first physical address using the MMU (42 of FIG. 1) and requests the hypervisor 30 to access the first region R1, the hypervisor 30 checks that the virtual machine 20 has no access right to the first region R1 using the MMU (44 of FIG. 1) and the SLAT table ST, and then may block the access of the virtual machine 20 to the first region R1.

Referring to FIG. 2, a plurality of tasks may be performed on the virtual machines 10 and 20. Such a plurality of tasks may include user level tasks U1 to U4 and kernel level tasks K1 to K4. The user level tasks U1 to U4 are tasks that exist in a user space of virtual machines 10 and 20, and the kernel level tasks K1 to K4 are tasks that exist in the kernel space of the virtual machines 10 and 20.

The user level tasks U1 to U4 are controlled by the guest OS and have less right than those of the virtual machines 10 and 20. That is, the virtual machine 10 has an access right to the first region R1 and the shared region SR of the memory 60, but the user level tasks U1 and U3 are controlled by the guest OS and do not have the same right as the access right of the virtual machine 10. Further, the virtual machine 20 has an access right to the second region R2 and the shared region SR of the memory 60, but the user level tasks U2 and U4 are controlled by the guest OS and do not have the same right as the access right of the virtual machine 20.

On the other hand, the kernel level tasks K1 to K4 have the same access right as the access right of the virtual machines 10 and 20 described above. That is, when the virtual machine 10 has the access right to the first region R1 and the shared region SR of the memory 60, the kernel level tasks K1 and K3 also have the same right as the access right of the virtual machine 10. When the virtual machine 20 has the access right to the second region R2 and the shared region SR of the memory 60, the kernel level tasks K2 and K4 may also have the same right as the access right of the virtual machine 20.

In a situation in which the kernel level task K1 of the virtual machine 10 and the kernel level task K2 of the virtual machine 20 perform the shared task in the shared region SR of the memory 60, when the kernel level task K3 of the virtual machine 10 is maliciously seized, a malicious attacker may arbitrarily transform the data stored in the shared region SR of the memory 60, using the kernel level task K3.

Accordingly, a configuration for preventing this may be required, and such an attack can be prevented, using the hypervisor 30 and the IMDI circuit (50 of FIG. 1) of the present embodiment. Hereinafter, this will be described more specifically.

Figure 3:
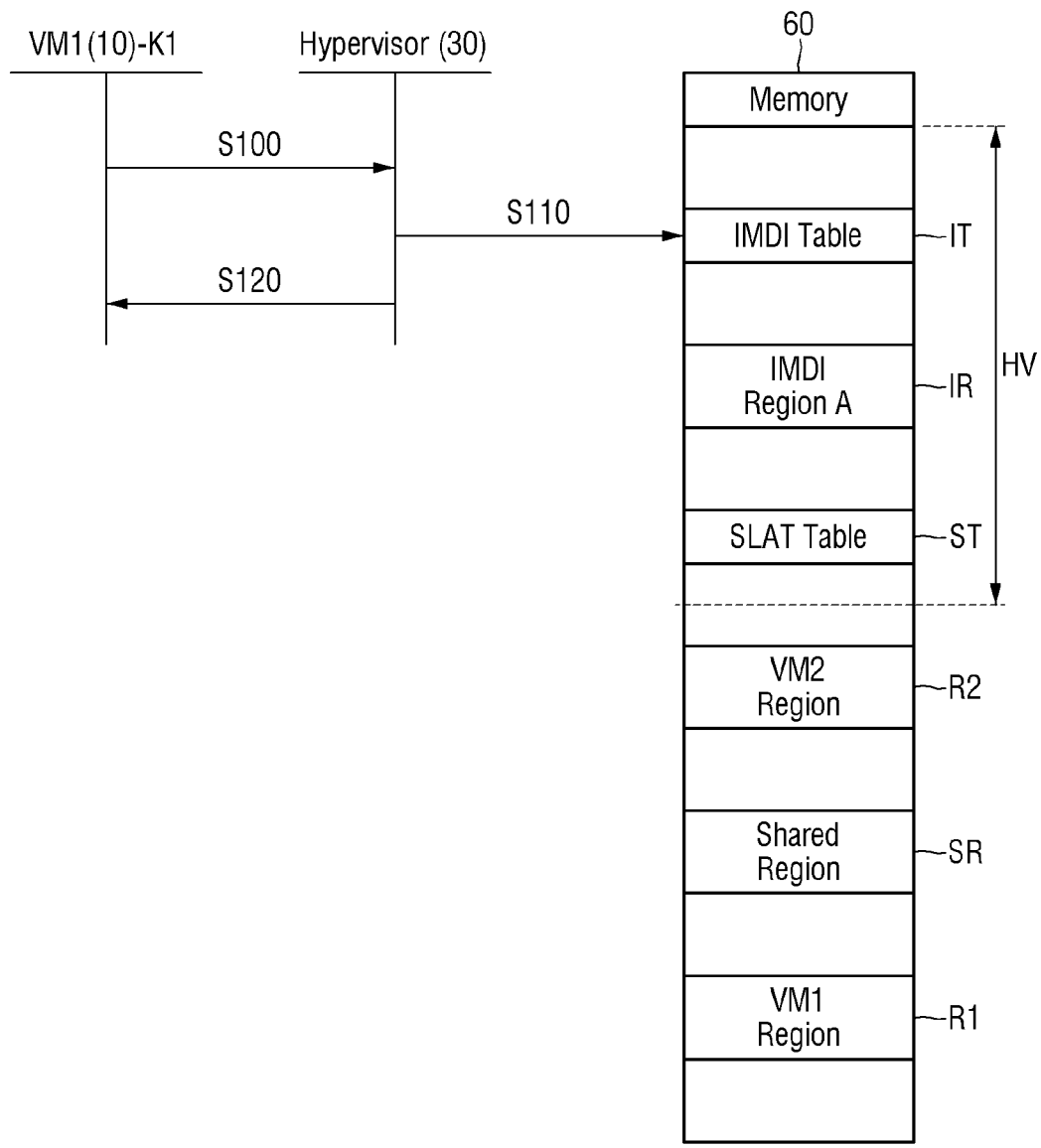
FIG. 3 is a diagram of an operation in which the hypervisor of FIG. 1 generates an in-memory data isolation (IMDI) table according to an example embodiment.
Figure 4:
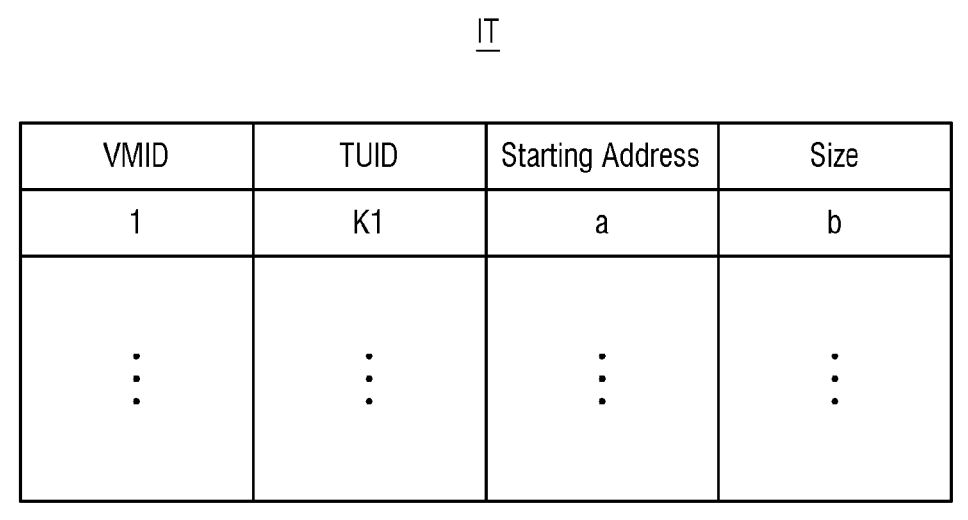

FIG. 3 is a diagram of an operation in which the hypervisor of FIG. 1 generates an IMDI table according to an example embodiment. FIG. 4 is a diagram of the IMDI table of FIG. 3 according to an example embodiment.

Referring to FIG. 3, in operation S100, a kernel level task K1 of the virtual machine 10 requests the hypervisor 30 to specify an IMDI region IR to which the kernel level task K1 is accessible.

In some embodiments, such a request may be made, using a hypervisor call provided by the hypervisor 30. That is, the hypervisor 30 according to the present embodiment may be a para-virtualized hypervisor.

Next, in operation S110, the hypervisor 30 stores the IMDI table IT that indicates the IMDI region IR in the hypervisor region HV of the memory 60, in response to the request.

Referring to FIGS. 3 and 4, such an IMDI table IT may include a virtual machine ID (VMID), a task ID (TUID), a starting address of an IMDI region IT, and a size of the IMDI region IT.

FIG. 4 shows an example of an IMDI table IT in which the kernel level task K1 of the virtual machine 10 has an access right and indicates the IMDI region IR of size b from the starting address a. The IMDI region IR corresponding to the memory 60 may be defined according to the storage contents of the IMDI table IT.

Such an IMDI region IR may be defined in the hypervisor region HV. That is, in the present embodiment, the SLAT table ST and the IMDI table IT may be stored in the hypervisor region HV of the memory 60, and the IMDI region IR may be defined in the hypervisor region HV.

Next, in operation S120, the hypervisor 30 stores the IMDI table IT in the memory 60, and then may transmit information about the generated IMDI region IR to the virtual machine 10.

Figure 5:
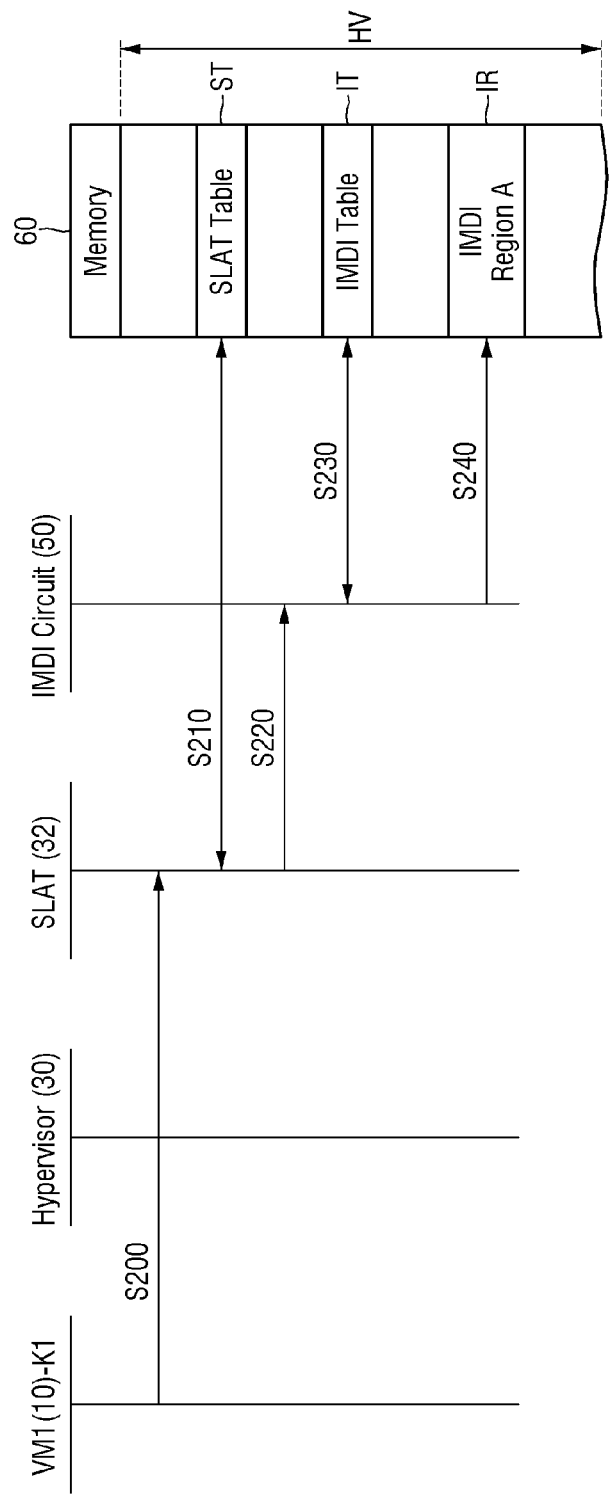
FIG. 5 is a diagram of an operation in which a first task of a first virtual machine accesses an IMDI region according to an example embodiment.

FIG. 5 is a diagram of an operation in which a first task of a first virtual machine accesses an IMDI region according to an example embodiment.

Referring to FIG. 5, in operation S200, the kernel level task K1 of the virtual machine 10 requests the SLAT module 32 of the hypervisor 30 to access the IMDI region IR.

In response thereto, in operation S210, the SLAT module 32 refers to the SLAT table ST of the memory 60.

When the determination is made on the basis of the stored contents of the SLAT table ST, since the region requested to be accessed by the kernel level task K1 of the virtual machine 10 is not the first region (R1 of FIG. 2) or the shared region (SR of FIG. 2) in which the access is permitted to the virtual machine 10, the SLAT module 32 will determine that an access of the kernel level task K1 of the virtual machine 10 to the IMDI region IR is not possible.

However, in operation S220, the SLAT module 32 does not directly respond to the inaccessibility to the virtual machine 10, and checks in the IMDI circuit 50 whether the kernel level task K1 of the virtual machine 10 can access the IMDI region IR.

In response thereto, in operation S230, the IMDI circuit 50 checks the IMDI table IT.

Further, if the region required to be accessed by the kernel level task K1 of the virtual machine 10 is determined to be within the region shown in FIG. 4, the IMDI circuit 50 permits an access. If the region required to be accessed by the kernel level task K1 of the virtual machine 10 is determined to be outside the region shown in FIG. 4, the IMDI circuit 50 may deny the access.

When the IMDI circuit 50 permits the access, the kernel level task K1 of the virtual machine 10 can access the IMDI region IR to write data or read stored data (S240).

Figure 6A:
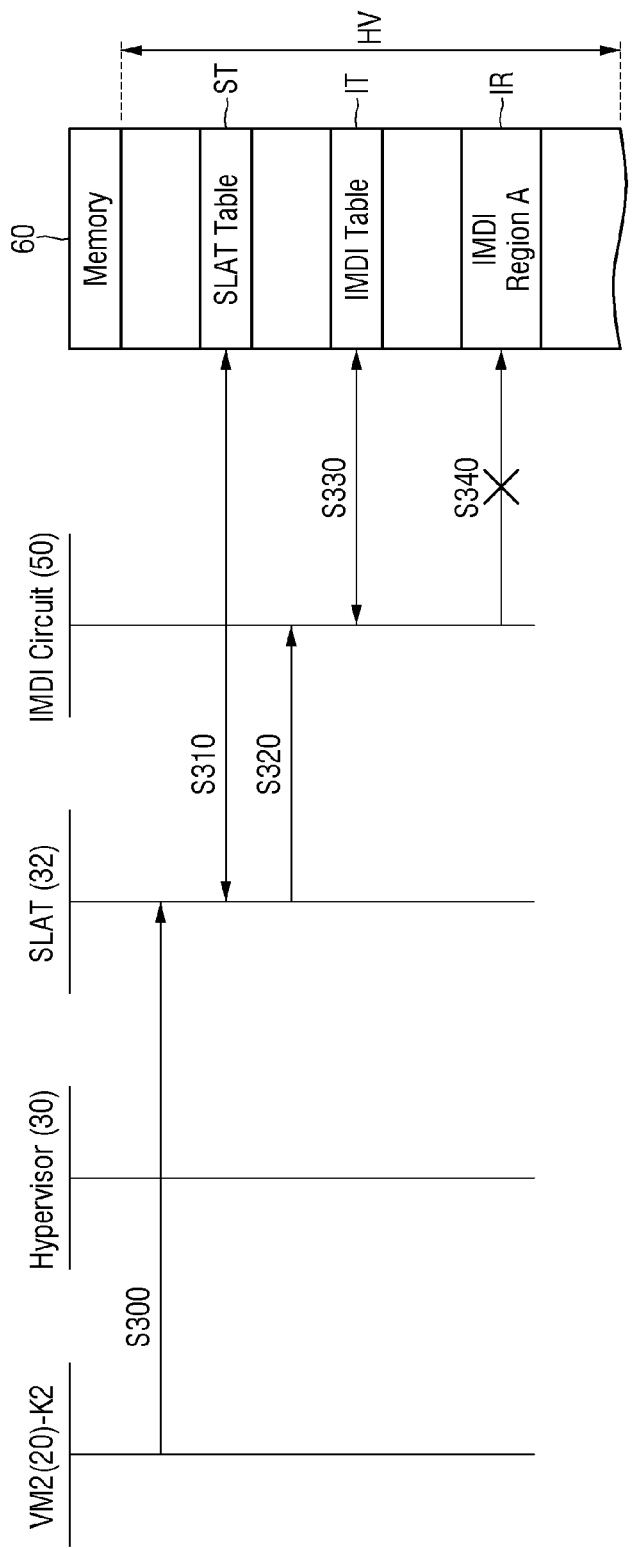
FIG. 6A is a diagram of the operation in which a task of a second virtual machine access the IMDI region according to an example embodiment.

FIG. 6A is a diagram of the operation in which a task of a second virtual machine access the IMDI region according to an example embodiment.

Referring to FIG. 6A, in operation S300, the kernel level task K2 of the virtual machine 20 requests the SLAT module 32 of the hypervisor 30 to access the IMDI region IR.

In response thereto, in operation S310, the SLAT module 32 refers to the SLAT table ST of the memory 60.

When the determination is made on the basis of the stored contents of the SLAT table ST, the region requested to be accessed by the kernel level task K2 of the virtual machine 20 is not the second region (R2 of FIG. 2) or the shared region (SR of FIG. 2) in which the access is permitted to the virtual machine 20, the SLAT module 32 will determine that an access of the kernel level task K2 of the virtual machine 20 to the IMDI region IR is not possible.

However, in operation S320, the SLAT module 32 does not directly respond to the inaccessibility to the virtual machine 20, and checks in the IMDI circuit 50 whether the kernel level task K2 of the virtual machine 20 can access the IMDI region IR.

In response thereto, in operation S330, the IMDI circuit 50 checks the IMDI table IT.

In the IMDI table IT shown in FIG. 4, since the IMDI region IR permitted to the kernel level task K2 of the virtual machine 20 does not exist, the IMDI circuit 50 does not permit the access. As a result, in operation S340, the kernel level task K2 of the virtual machine 20 cannot access the IMDI region IR.

Figure 6B:
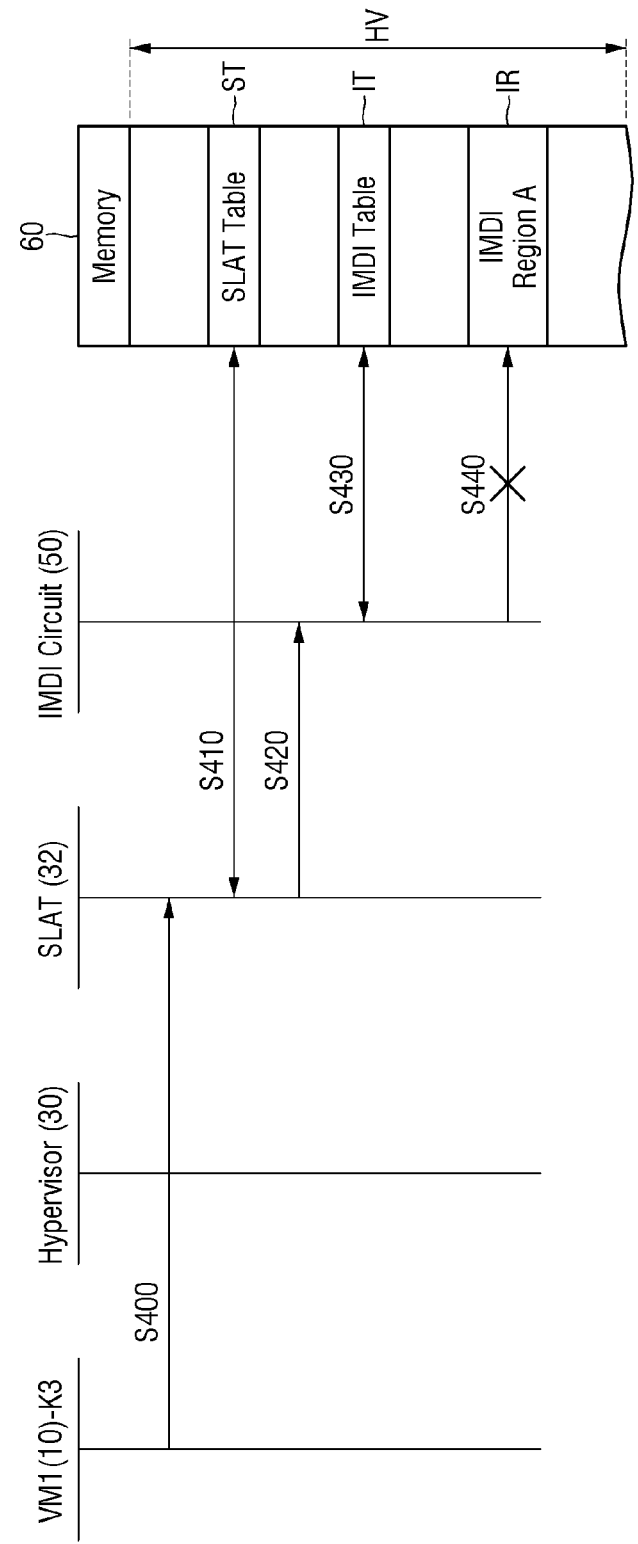
FIG. 6B is a diagram of an operation in which a second task of the first virtual machine accesses the IMDI region according to an example embodiment.

FIG. 6B is a diagram of an operation in which a second task of the first virtual machine accesses the IMDI region according to an example embodiment.

Referring to FIG. 6B, in operation S400, the kernel level task K1 of the virtual machine 10 requests the SLAT module 32 of the hypervisor 30 to access the IMDI region IR.

In response thereto, in operation S410, the SLAT module 32 refers to the SLAT table ST of the memory 60.

When the determination is made on the basis of the stored contents of the SLAT table ST, the region requested to be accessed by the kernel level task K3 of the virtual machine 10 is not the first region (R1 of FIG. 2) or the shared region (SR of FIG. 2) in which the access is permitted to the virtual machine 10, the SLAT module 32 will determine that access of the kernel level task K3 of the virtual machine 10 to the IMDI region IR is not possible.

However, in operation S420, the SLAT module 32 does not directly respond to the inaccessibility to the virtual machine 10, and checks in the IMDI circuit 50 whether the kernel level task K3 of the virtual machine 10 can access the IMDI region IR.

In response thereto, in operation S430, the IMDI circuit 50 checks the IMDI table IT.

In the IMDI table IT shown in FIG. 4, the kernel level task K1 of the virtual machine 10 is permitted to access the IMDI region IR, but the kernel level task K3 of the virtual machine 10 is not permitted to access the IMDI region IR. Therefore, the IMDI circuit 50 does not permit the access. As a result, in operation S440, the kernel level task K3 of the virtual machine 10 cannot access the IMDI region IR.

Figure 7:
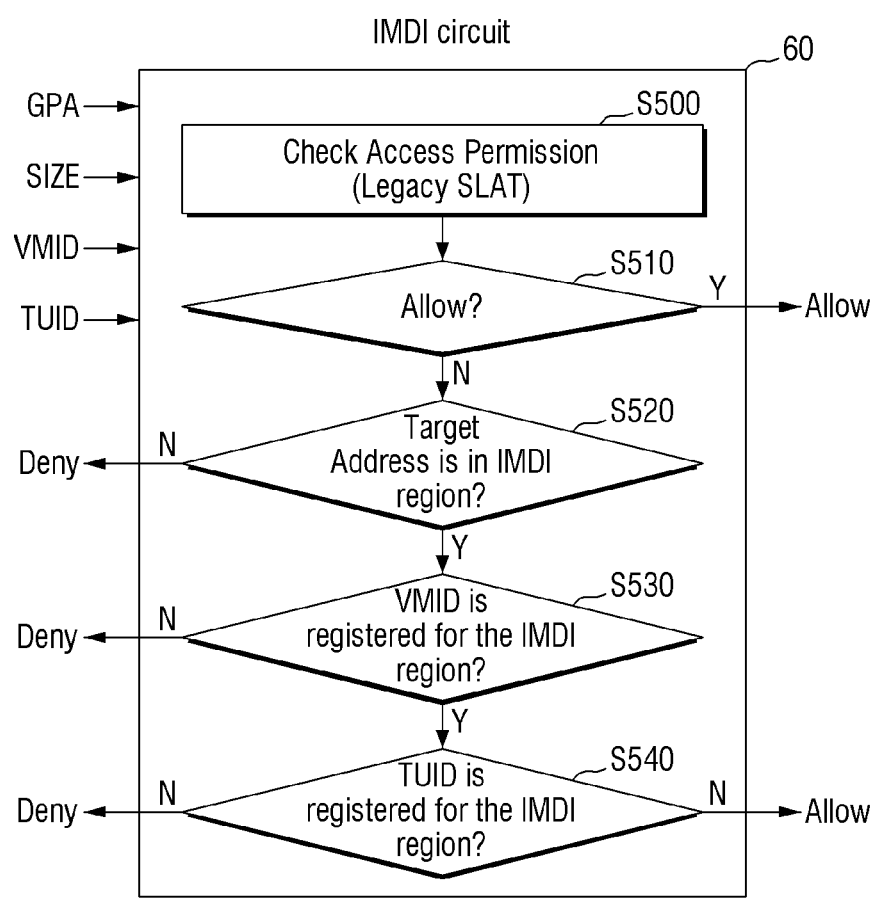
FIG. 7 is a diagram of the operation of an IMDI circuit of FIG. 1 according to an example embodiment.

FIG. 7 is a diagram for explaining the operation of the IMDI circuit of FIG. 1.

Referring to FIG. 7, an access request including address information GPA of an access target region, a size SIZE of the access target region, an ID VMID of the virtual machine, and the task ID ID is provided from the task of the virtual machine, and, in operation S500, the IMDI circuit 50 checks an access permission to the memory region requested to be accessed by the task of the virtual machine through the second level address translation SLAT.

In some embodiments, the address information GPA of the access target region may be, for example, the first physical address described above, but the embodiments are not limited thereto.

Further, in operation S510, the IMDI circuit 50 determines whether the memory region requested to be accessed by the task of the virtual machine can be accessed through the second level address translation.

If it is determined that the memory region requested to be accessed by the task of the virtual machine can be accessed through the second level address translation SLAT (operation S510-Y), the access to the region is permitted.

If it is determined that the memory region requested to be accessed by the task of the virtual machine cannot be accessed through the second level address translation (operation S510-N), in operation S520, it is determined whether the memory region requested to be accessed by the task of the virtual machine corresponds to the IMDI region that is set through the IMDI table.

If the memory region requested to be accessed by the task of the virtual machine does not correspond to the IMDI region that is set through the IMDI table (operation S520-N), accessibility is notified to the task of the virtual machine.

If the memory region requested to be accessed by the task of the virtual machine corresponds to the IMDI region that is set through the IMDI table (operation S520-Y), in operation S530, it is determined whether the virtual machine ID of the requested virtual machine is a virtual machine ID that is registered in the IMDI region of the IMDI table.

If the virtual machine ID of the requested virtual machine ID is not the virtual machine ID registered in the IMDI region of the IMDI table (operation S530-N), accessibility is notified to the task of the virtual machine.

If the virtual machine ID of the requested virtual machine is the virtual machine ID registered in the IMDI region of the IMDI table (operation S530-Y), in operation S540, it is determined whether the task ID of the requested virtual machine is the task ID registered in the IMDI region of the IMDI table (S540).

If the task ID of the requested virtual machine ID is not the task ID registered in the IMDI region of the IMDI table (operation S540-N), accessibility is notified to the task of the virtual machine.

If the task ID of the requested virtual machine is the task ID registered in the IMDI region of the IMDI table (operation S540-Y), an access to the region is permitted.

In the present embodiment, the security reliability of the memory management system can be improved, by defining an IMDI region that grants an access right to the memory for each task of the virtual machine and managing the IMDI region using the IMDI table.

Figure 8:
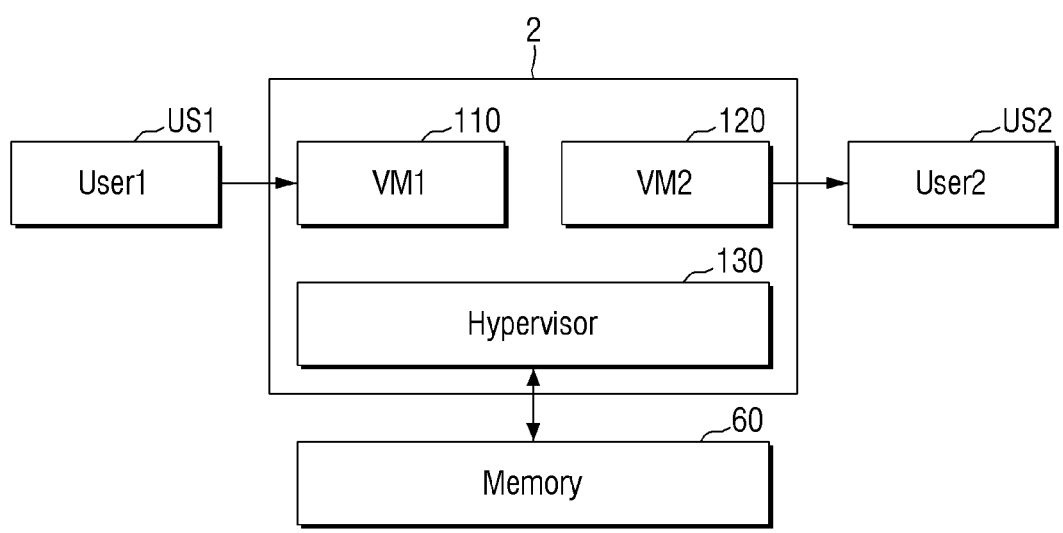
FIG. 8 is a block diagram of the memory management system according to an example embodiment.

FIG. 8 is a block diagram of the memory management system according to an example embodiment. Hereinafter, differences from the above-described embodiment will be mainly described.

Referring to FIG. 8, a memory management system 2 may include virtual machines 110 and 120 and a hypervisor 130. Although not shown in detail, the memory management system 2 may include the processor 40, and the IMDI circuit 50 shown in FIG. 1.

The memory management system 2 may be, for example, a memory management system that supports a multi-tenant system. The virtual machine 110 may be connected to a first user US1 to perform a request of the first user US1, and the virtual machine 120 may be connected to a second user US2 to perform a request of the second user US2.

In some embodiments, the first user US1 and the second user US2 may be different users from each other. Further, in some embodiments, the first user US1 and the second user US2 may be different user processes of one user. Furthermore, in some other embodiments, the first user US1 and the second user US2 may be different user processes of different users.

Figure 9:
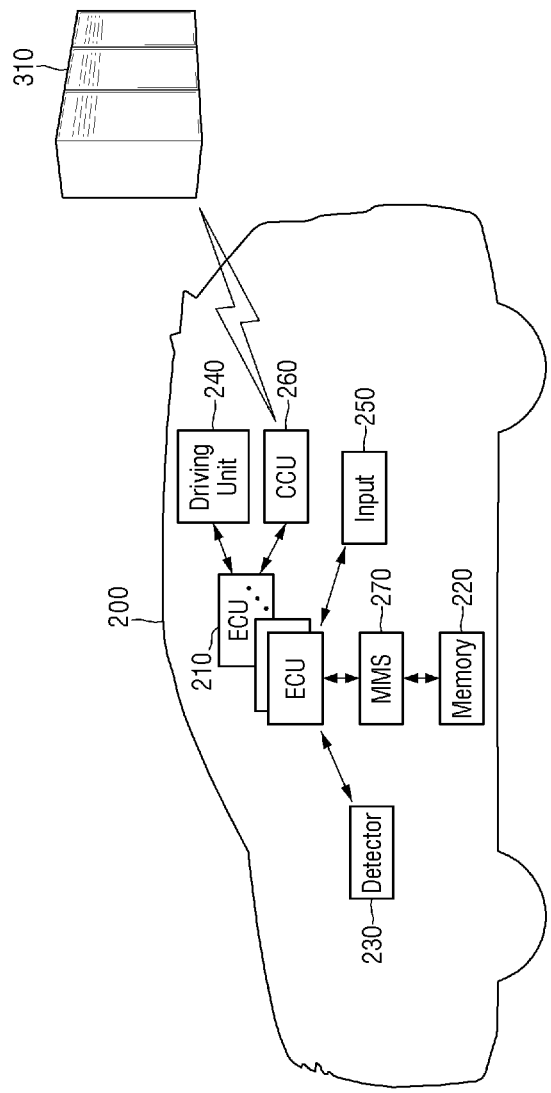
FIG. 9 is a diagram of a vehicle equipped with the memory management system according to an example embodiment.
Figure 10:
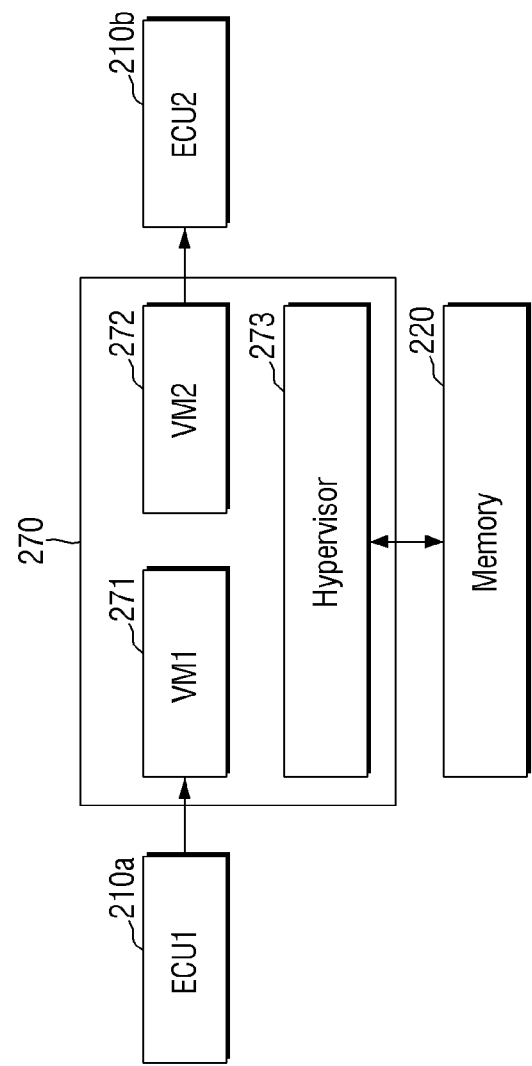
FIG. 10 is a block diagram of the memory management system of FIG. 9 according to an example embodiment.

FIG. 9 is a diagram of a vehicle equipped with the memory management system according to an example embodiment. FIG. 10 is a block diagram of the memory management system of FIG. 9 according to an example embodiment.

A vehicle 200 may include a plurality of electronic control units (ECU) 210, a memory management system 270, and a memory 220.

Each electronic control device of the plurality of electronic control devices 210 is electrically, mechanically, and communicatively connected to at least one of the plurality of devices provided in the vehicle 200, and may control the operation of at least one device on the basis of any one function execution command.

Here, the plurality of devices may include an acquiring device 230 that acquires information required to perform at least one function, and a driving unit 240 that performs at least one function.

For example, the acquiring device 230 may include various detecting units and image acquiring units. The driving unit 240 may include a fan and compressor of an air conditioner, a fan of a ventilation device, an engine and a motor of a power device, a motor of a steering device, a motor and a valve of a brake device, an opening/closing device of a door or a tailgate, and the like.

The plurality of electronic control devices 210 may communicate with the acquiring device 230 and the driving unit 240 using, for example, at least one of an Ethernet, a low voltage differential signaling (LVDS) communication, and a local interconnect network (LIN) communication.

The plurality of electronic control devices 210 determine whether there is a need to perform the function on the basis of the information acquired through the acquiring device 230, and when it is determined that there is a need to perform the function, the plurality of electronic control devices 210 control the operation of the driving unit 240 that performs the function, and may control an amount of operation on the basis of the acquired information. At this time, the plurality of electronic control devices 210 may store the acquired information in the memory 220, or may read and use the information stored in the memory 220. The memory management system 270 may receive requests of the plurality of electronic control devices 210 to store information in the memory 220, or provide the information stored in the memory 220 to the plurality of electronic control devices 210.

Referring to FIGS. 9 and 10, the memory management system 270 may include virtual machines 271 and 272 and a hypervisor 273. Although not shown in detail, the memory management system 270 may include the processor 40, the IMDI circuit 50 shown in FIG. 1.

A virtual machine 271 may be connected to the first electronic control device 210a to perform a request of the first electronic control device 210a, and the virtual machine 272 may be connected to the second electronic control device 210b to perform a request of the second electronic control device 210b.

In some embodiments, the first electronic control device 210a is a device that collects and processes information from the acquiring device 230, and the second electronic control device 210b may be a device that controls the operation of the driving unit 240. In some embodiments, the first electronic control device 210a may be a device that processes infotainment, and the second electronic control device 210b may be a device that processes operating information of the vehicle. However, the embodiments are not limited thereto.

Referring to FIG. 9, the plurality of electronic control devices 210 is able to control the operation of the driving unit 240 that performs the function on the basis of the function execution command that is input through the input unit 250, and is also able to check a setting amount corresponding to the information that is input through the input unit 250 and control the operation of the driving unit 240 that performs the function on the basis of the checked setting amount.

Each electronic control device 210 may control any one function independently, or may control any one function in cooperation with other electronic control devices.

For example, when a distance to an obstacle detected through a distance detection unit is within a reference distance, an electronic control device of a collision prevention device may output a warning sound for a collision with the obstacle through a speaker.

An electronic control device of an autonomous driving control device may receive navigation information, road image information, and distance information to obstacles in cooperation with the electronic control device of the vehicle terminal, the electronic control device of the image acquisition unit, and the electronic control device of the collision prevention device, and control the power device, the brake device, and the steering device using the received information, thereby performing the autonomous driving.

A connectivity control unit (CCU) 260 is electrically, mechanically, and communicatively connected to each of the plurality of electronic control devices 210, and communicates with each of the plurality of electronic control devices 210.

That is, the connectivity control unit 260 is able to directly communicate with a plurality of electronic control devices 210 provided inside the vehicle, is able to communicate with an external server, and is also able to communicate with an external terminal through an interface.

Here, the connectivity control unit 260 may communicate with the plurality of electronic control devices 210, and may communicate with a server 310, using an antenna (not shown) and a radio frequency (RF) communication.

Further, the connectivity control unit 260 may communicate with the server 310 by wireless communication. At this time, the wireless communication between the connectivity control unit 260 and the server 310 may be performed through various wireless communication methods such as a global system for mobile communication (GSM), a code division multiple access (CDMA), a wideband CMDA (WCDMA), a universal mobile telecommunications system (UMTS), a time division multiple access (TDMA), and a long term evolution (LTE), in addition to a Wifi module and a Wireless broadband module.

At least one of the components, elements, modules or units (collectively "components" in this paragraph) represented by a block in the drawings such as FIGS. 1, 2, and 8-10 may be embodied as various numbers of hardware, software and/or firmware structures that execute respective functions described above. At least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above example embodiments may be implemented in algorithms that execute on one or more processors. Furthermore, the components represented by a block or processing steps may employ any number of related art techniques for electronics configuration, signal processing and/or control, data processing and the like.

Although embodiments of the present disclosure have been described above with reference to the accompanying drawings, the present disclosure is not limited thereto and may be embodied in various different forms. It will be understood by those of ordinary skill in the art that the present disclosure may be implemented in other specific forms without departing from the technical spirit or essential features of the present disclosure. Therefore, it should be understood that the embodiments described above are merely examples in all respects and not restrictive.

What is claimed is:

1. A memory management system comprising:
  a processor;
  a first virtual machine;
  a second virtual machine; and
  a hypervisor configured to be executed by the processor to:
    manage a region to which the first virtual machine and the second virtual machine access in a memory,
    control the first virtual machine to access a first region and a shared region in the memory and not to access a second region different from the first region in the memory,
    control the second virtual machine to access the shared region and the second region in the memory and not to access the first region in the memory, and
    in response to a request of the first virtual machine, store an in-memory data isolation (IMDI) table in a third region of the memory that indicates an IMDI region in the memory that a task of the first virtual machine accesses and a task of the second virtual machine does not access,
  wherein the IMDI region is a forth region in the memory that is different from the first region, the second region and the third region,
  wherein the task of the first virtual machine comprises a first task and a second task, and wherein the first task accesses the IMDI region and the second task does not access the IMDI region,
  wherein the first task and the second task are kernel level tasks of the first virtual machine, and
  wherein the IMDI table is stored in a region of the memory that the hypervisor accesses and that the first virtual machine and the second virtual machine do not access.

2. The memory management system of claim 1, wherein the first virtual machine is configured to request, using a hypervisor call, the hypervisor to specify the IIMDI region.

3. The memory management system of claim 1, wherein the IIMDI table comprises a virtual machine identifier (ID) related to the first virtual machine, and a task ID related to a task of the first virtual machine.

4. The memory management system of claim 3, wherein the IIMDI table comprises a starting address of the IIMDI region and a size of the IIMDI region.

5. The memory management system of claim 1, further comprising: an IMDI circuit configured to determine whether to permit an access of the IMDI region, based on reference to the IMDI table.

6. The memory management system of claim 5, wherein the IMDI circuit is different from the hypervisor.

7. A memory management system comprising:
  a virtual machine on which a kernel level task is performed; and
  an in-memory data isolation (IMDI) circuit configured to:
    receive an access request for an IMDI region of a memory from the kernel level task of the virtual machine, and
    determine whether to permit an access of the kernel level task of the virtual machine to the IMDI region, based on reference to a virtual machine ID and a task ID of an IMDI table that is stored in the memory and indicates the IMDI region,
  wherein the virtual machine comprises a first virtual machine and a second virtual machine,
  wherein the memory comprises a first region that the first virtual machine accesses and the second virtual machine does not access, a second region that the first virtual machine does not access and the second virtual machine accesses, and a third region including the IMDI table, and
  wherein the IMDI region is a forth region in the memory that is different from the first region, the second region and the third region,
  wherein the memory comprises a shared region that the first virtual machine and the second virtual machine access, and a second level address translation (SLAT) table that indicates the first region, the second region and the shared region, and
  wherein the IMDI table is different from the SLAT table,
  wherein the memory management system further comprising: a hypervisor configured to be executed by a processor to manage a region that the first virtual machine and the second virtual machine access in the memory, based on reference to the SLAT table, and wherein the IMDI table is stored in a region that the hypervisor of the memory accesses and that the virtual machine does not access.

8. The memory management system of claim 7, wherein the kernel level task of the virtual machine requests, using a hypervisor call, the hypervisor to specify the IMDI region.

9. The memory management system of claim 8, wherein the hypervisor is configured to be executed by the processor to store the IIMDI table indicating the IMDI region in the memory, in response to a request of the kernel level task of the virtual machine.

10. The memory management system of claim 7, wherein the hypervisor configured to be executed by the processor to manage a region that the virtual machine accesses in the memory, wherein the IMDI circuit is different from the hypervisor.

11. A method comprising:
providing a memory comprising a first region that a first virtual machine accesses and a second virtual machine does not access, a second region that the first virtual machine does not access and the second virtual machine accesses, and a shared region that the first virtual machine and the second virtual machine access;
storing, in the memory, an in-memory data isolation (IMDI) table in a third region of the memory, which indicates an IMDI region in the memory that a first task of the first virtual machine accesses and a second task of the first virtual machine does not access, in response to a request of the first task from the first virtual machine by a hypervisor; and
determining whether any one of the first task and the second task of the first virtual machine accesses the IMDI region based on reference to the IMDI table, in response to an access request to the IMDI region from any one of the first task or the second task of the first virtual machine by an IMDI circuit,
wherein the first task and the second task are a kernel level task of the first virtual machine, and
wherein the IMDI region is a forth region in the memory that is different from the first region, the second region and the third region.

12. The method of claim 11, wherein the first task of the first virtual machine requests, using a hypervisor call, the hypervisor to specify the IMDI region.

* * * * *